(12) United States Patent
Wessling et al.

(10) Patent No.: US 8,751,494 B2
(45) Date of Patent: Jun. 10, 2014

(54) CONSTRUCTING ALBUM DATA USING DISCRETE TRACK DATA FROM MULTIPLE SOURCES

(75) Inventors: Jens Nicholas Wessling, Ann Arbor, MI (US); Robert Dennis Kahlbaum, Ypsilanti, MI (US)

(73) Assignee: Rovi Technologies Corporation, Santa Clara, CA (US)

( * ) Notice: Subject to any disclaimer, the term of this patent is extended or adjusted under 35 U.S.C. 154(b) by 968 days.

(21) Appl. No.: 12/316,706

(22) Filed: Dec. 15, 2008

(65) Prior Publication Data

US 2010/0153393 A1    Jun. 17, 2010

(51) Int. Cl.
G06F 7/00    (2006.01)

(52) U.S. Cl.
USPC ........................................... 707/737

(58) Field of Classification Search
USPC ............................. 707/999.009, 737; 369/53.2
See application file for complete search history.

(56) References Cited

U.S. PATENT DOCUMENTS

| | | | |
|---|---|---|---|
| 5,751,672 A * | 5/1998 | Yankowski | 709/238 |
| 6,230,192 B1 | 5/2001 | Roberts et al. | |
| 6,330,593 B1 | 12/2001 | Roberts et al. | |
| 7,277,766 B1 | 10/2007 | Khan et al. | |
| 7,359,900 B2 | 4/2008 | Bogdanov | |
| 2002/0133499 A1* | 9/2002 | Ward et al. | 707/102 |
| 2002/0161741 A1* | 10/2002 | Wang et al. | 707/1 |
| 2005/0050047 A1* | 3/2005 | Laronne et al. | 707/9 |
| 2006/0149533 A1 | 7/2006 | Bogdanov | |
| 2007/0041667 A1 | 2/2007 | Cox | |
| 2007/0106405 A1 | 5/2007 | Cook et al. | |
| 2008/0256042 A1 | 10/2008 | Whitman | |
| 2010/0124335 A1 | 5/2010 | Wessling et al. | |
| 2010/0191739 A1 | 7/2010 | Wessling et al. | |
| 2010/0228704 A1 | 9/2010 | Kahlbaum et al. | |
| 2010/0228736 A1 | 9/2010 | Kahlbaum et al. | |
| 2010/0318493 A1 | 12/2010 | Wessling | |
| 2010/0318586 A1 | 12/2010 | Wessling | |
| 2011/0072117 A1 | 3/2011 | Wessling et al. | |
| 2011/0113037 A1 | 5/2011 | Wessling et al. | |
| 2011/0276567 A1 | 11/2011 | Asikainen et al. | |
| 2011/0307492 A1 | 12/2011 | Williams et al. | |

OTHER PUBLICATIONS

International Search Report for International application No. PCT/US2009/006041, mailed Jun. 25, 2010, 1 page.
PCT International Search Report, dated Jun. 25, 2010 in corresponding International Application No. PCT/US2009/006041.

(Continued)

Primary Examiner — Cheryl Lewis
Assistant Examiner — Hung Havan
(74) Attorney, Agent, or Firm — Inventive Patent Law P.C.; Jim H. Salter

(57) ABSTRACT

A method and a system are provided for constructing album data using discrete track data from multiple sources. In one example, the system identifies one or more set of tracks having a similar album title, wherein the one or more set of tracks are obtained from one or more client devices. The system then searches across the one or more set of tracks for tracks having a matching fingerprint and a matching album title. The system groups tracks that match according to an original album title in metadata to obtain grouped tracks. The system mines across the grouped tracks to generate a juxtaposition of track data from the one or more client devices. The system then generates album data for one or more albums based on the juxtaposition of track data.

23 Claims, 4 Drawing Sheets

(56) References Cited

OTHER PUBLICATIONS

International Preliminary Report on Patentability dated Jun. 21, 2011 in corresponding PCT Application No. PCT/US2009/006041.

Written Opinion of the International Searching Authority dated Jun. 25, 2010 in corresponding PCT Application No. PCT/US/2009/006041.

* cited by examiner

US 8,751,494 B2

CONSTRUCTING ALBUM DATA USING DISCRETE TRACK DATA FROM MULTIPLE SOURCES

FIELD OF THE INVENTION

The present invention relates to constructing album data. More particularly, the present invention relates to constructing album data using discrete data from multiple sources.

BACKGROUND

Methods exist for reading table of contents data from compact discs (CDs) and using the data to lookup information in databases. U.S. Pat. Nos. 6,230,192 and 6,330,593 (the '192 and '593 patents) provide conventional examples of such methods. The '192 and the '593 patents relate generally to delivering supplemental entertainment content to a user listening to a musical recording. The content is accessed using a Web browser. Using conventional techniques, an identifier is computed for the album being played. The identifier may be determined based on the number and lengths of tracks on the album. The identifier is used to retrieve, from a database, information relating to the recordings played by the user.

SUMMARY

In conventional systems, the album identifier is computed upon detection of a disc in the CD player of the user's computer and sent to a remote server hosting a Web site containing information about the albums. The server uses the identifier as a key to lookup a single matching record in an albums database and outputs the album information stored in that matching record.

Unfortunately, there are disadvantages of these conventional systems. For example, conventional systems do not account for the following: users ripping tracks to hard disk and then later ripping the song back to CD, causing changes in album structure; users changing metadata of a track; and record companies changing the names of tracks for different albums. These occurrences could easily add up to cause a conventional system to be unable to produce reliable album data for a user. The result may be an identifier being computed that does not match any identifier stored in the albums database, which in turn might prevent retrieval of the appropriate album data.

Accordingly, these conventional approaches suffer from a number of disadvantages. These methods are predicated on computing a single identifier for a recording and looking up information in a database containing potentially several matching records.

What is needed is an improved method having features for addressing the problems mentioned above and new features not yet discussed. Broadly speaking, the inventive embodiments provided here fill these needs by providing a method and a system for constructing album data using discrete track data from multiple sources. It should be appreciated that these embodiments may be implemented in numerous ways, including as a method, a process, an apparatus, a system or a device. The inventive embodiments are summarized below.

In one embodiment, a method is provided for constructing album data. The method comprises the following: identifying one or more set of tracks having a similar album title, wherein the one or more set of tracks are obtained from one or more client devices; searching across the one or more set of tracks for tracks having a matching fingerprint and a matching album title; grouping tracks that match according to an original album title in metadata to obtain grouped tracks; mining across the grouped tracks to generate a juxtaposition of track data from the one or more client devices; and generating album data for one or more albums based on the juxtaposition of track data.

In another embodiment, a system is provided for constructing album data. The system is configured for the following: identifying one or more set of tracks having a similar album title, wherein the one or more set of tracks are obtained from one or more client devices; searching across the one or more set of tracks for tracks having a matching fingerprint and a matching album title; grouping tracks that match according to an original album title in metadata to obtain grouped tracks; mining across the grouped tracks to generate a juxtaposition of track data from the one or more client devices; and generating album data for one or more albums based on the juxtaposition of track data.

In still another embodiment, a computer readable medium carrying one or more instructions for constructing album data is provided. The one or more instructions, when executed by one or more processors, cause the one or more processors to perform the following steps: identifying one or more set of tracks having a similar album title, wherein the one or more set of tracks are obtained from one or more client devices; searching across the one or more set of tracks for tracks having a matching fingerprint and a matching album title; grouping tracks that match according to an original album title in metadata to obtain grouped tracks; mining across the grouped tracks to generate a juxtaposition of track data from the one or more client devices; and generating album data for one or more albums based on the juxtaposition of track data.

The invention encompasses other embodiments configured as set forth above and with other features and alternatives.

BRIEF DESCRIPTION OF THE DRAWINGS

The inventive embodiments will be readily understood by the following detailed description in conjunction with the accompanying drawings. To facilitate this description, like reference numerals designate like structural elements.

DETAILED DESCRIPTION

Figure 1:
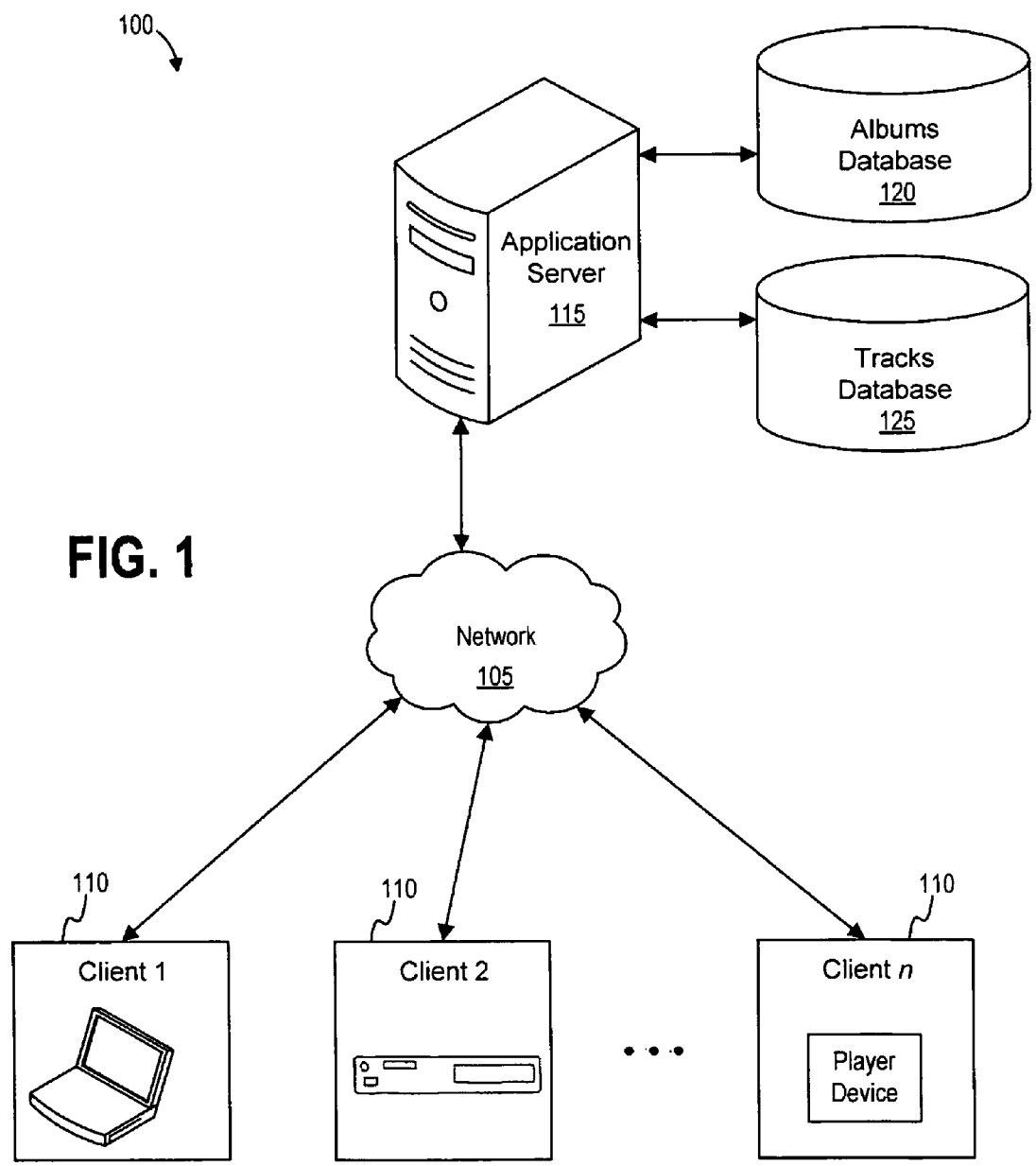
FIG. 1 is a block diagram of a system for constructing album data using discrete track data from multiple sources, in accordance with some embodiments.

An invention is disclosed for a method and a system for constructing album data using discrete track data from multiple sources. Numerous specific details are set forth in order to provide a thorough understanding of various embodiments. It will be understood, however, to one skilled in the art, that the embodiments may be practiced with other specific details.

DEFINITIONS

Some terms are defined below for clarity purposes. These terms are not rigidly restricted to these definitions. These terms and other terms may also be defined by their use in the context of this description.

"Album" means a collection of tracks. An album is typically originally published by an established entity, such as a record label (i.e., record company, such as Warner or Universal).

"Album data" (i.e., "album level data") is data related to a particular album. Album data typically includes without limitation the TOC for the particular album.

"Compact Disc" (CD) is an optical disc used to store digital data, originally developed for storing digital audio. Standard CDs have a diameter of 120 mm and can hold up to 80 minutes of audio. There is also the Mini CD, with diameters ranging from 60 to 80 mm; they are sometimes used for CD singles, storing up to 24 minutes of audio. CD technology has also been adapted and expanded to include data storage CD-ROM, write-once audio and data storage CD-R, rewritable media CD-RW, Super Audio CD (SACD), Video Compact Discs (VCD), Super Video Compact Discs (SVCD), Photo CD, Picture CD, CD-i, and Enhanced CD.

"Computer" (i.e., "user computer" or "client" or "server") may refer to a single computer or to a system of interacting computers. A computer is a combination of a hardware system, a software operating system and perhaps one or more software application programs. Examples of a computer include without limitation a laptop computer, a palmtop computer, a smart phone, a cell phone, a mobile phone, an mp3 player, digital audio recorder, digital video recorder, an IBM-type personal computer (PC) having an operating system such as Microsoft Windows®, an Apple® computer having an operating system such as MAC-OS, hardware having a JAVA-OS operating system, and a Sun Microsystems Workstation having a UNIX operating system.

"Device" means hardware, software or a combination thereof. A device may sometimes be referred to as an apparatus. Each device is configured to carry out one or more steps of the method of constructing album data using discrete track data from multiple sources.

"Fingerprint" (i.e., "audio fingerprint" or "acoustic fingerprint") is a digital measure of certain acoustic properties that is deterministically generated from an audio signal that can be used to identify an audio sample and/or quickly locate similar items in an audio database. "Fingerprinting" is the process of generating a fingerprint. Practical uses of audio fingerprinting include identifying songs, records, melodies, tunes, or advertisements; radio broadcast and peer to peer network monitoring; sound effect library management; video file identification; and much more. A fingerprint is an independent piece of data that is not affected by metadata. The company Macrovision® has databases that store over 25 million unique fingerprints for various audio samples, including without limitation music tracks of albums. U.S. Pat. No. 7,277,766 (the '766 patent), entitled "Method and System for Analyzing Digital Audio Files", provides an example of an apparatus for fingerprinting an audio waveform. U.S. Publication No. 2006/0149533 (the '360 patent application), entitled "Methods and Apparatus for Identifying Media Objects", provides an example of an apparatus for generating an audio fingerprint of an audio recording.

"Metadata" generally means data that describes data. More particularly, metadata means data that describes the contents of a digital audio recording. Such metadata may include, for example, song name, artist information (e.g., name, birth date, discography, etc.), album information (e.g., album title, review, track listing, sound samples, etc.), relational information (e.g., similar artists and albums, genre, etc.), and other types of supplemental information. Conventional CDs do not typically contain metadata. Metadata is attached to a particular song after, for example, the song has been ripped, converted to another digital audio format (e.g., mp3) and stored on a hard drive. Future or other disc technology, besides conventional CDs, may include metadata.

"Network" means a connection between any two or more computers, which permits the transmission of data. A network may be any combination of networks, including without limitation the Internet, a local area network, a wide area network, a wireless network and a cellular network.

"Set of tracks" typically means a group of tracks having similar album titles.

"Similar album titles" (i.e., "common album titles") means album titles that are reasonably alike and that are not necessarily perfect matches. For example, "What's Going On" and "what is going on" may be considered to be similar album titles.

"Song" means a musical composition. A song is typically recorded onto a track by a record label (i.e., record company). A song may have many different versions, for example, a radio version and an extended version.

"Table of Contents" (TOC) means the list of tracks, the track start times and the track end times. The TOC data consists of a string of concatenated track start times for every track on a CD. The track start times are typically expressed as six-digit hexadecimal values. TOC data is stored on a CD using a format specified in the "Red Book" (Compact Disc Digital Audio System Description, Philips Corporation, May 1999), which provides the standards for digital audio CDs. TOC data is typically used to identify a CD. U.S. Pat. No. 7,359,900 (the '900 patent), entitled "Digital Audio Track Set Recognition System", provides an example of a method of using TOC data to identify a CD.

"Track" means a data block storing at least a portion of a song. "Track" and "song" usually mean the same thing, but not necessarily. For example, track number 2 of two identical CDs is the same song and the same track. In contrast, a radio version and an extended version may be considered to be the same song; however, these two different versions would be on different tracks.

"Track data" (i.e., "track level data") is data related to a particular track. Track data typically includes without limitation metadata and a fingerprint.

"Track number" is the number in the metadata associated with a particular track. For example, if an album has 9 tracks, the tracks are numbered from 1 to 9 with a track number metadata field for each track.

"Web browser" means any software program which can display text, graphics, or both, from Web pages on Web sites. Examples of a Web browser include without limitation Mozilla Firefox® and Microsoft Explorer®.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo® Web server.

"Web site" means at least one Web page, and more commonly a plurality of Web pages, virtually connected to form a coherent group.

For the implementations of the present system, a software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java and Java Scripts. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

Architecture Overview

The present system involves reading tracks and constructing fingerprints from a collection of audio files (e.g., an album that has been digitized and stored on a user computer using an audio player). The system, over a time period (e.g., minutes, hours or days), constructs multiple fingerprints and gathers metadata from many different user computers. The system builds and uses a database that stores a multitude of audio fingerprints for a multitude of different tracks; the system builds and uses a database that stores track data; and the system builds and uses a database that stores album data. The fingerprints, the track data and the album data are typically not preexisting in the databases and are built using gathered information, as discussed further below. Based on relationships between the multiple track readings, the metadata and the fingerprints, the system updates and refines the stored album data using methods described in more detail below.

FIG. 1 is a block diagram of a system 100 for constructing album data using discrete track data from multiple sources, in accordance with some embodiments. A network 105 is coupled to an application server 115. The application server 115 is coupled to (or includes) an albums database 120 and a tracks database 125. The albums database 120 may store, among other things, album data of digital audio recordings. The tracks database 125 may store, among other things, metadata and fingerprints of various audio tracks. The network 105 is also coupled to a number of client devices 110, Client 1 through Client n, that are configured to store digital audio recordings and associated metadata. The client devices may be for example a personal computer (Client 1), a component CD player (Client 2), or another player device (Client n), such as an mp3 player or a personal digital assistant. Other possibilities for client devices 110 exist as well.

Each client device 110 has hardware and/or software that is configured to communicate with the application server 115 to retrieve and send information relating to the recordings. For example, a client device 110 may have an operating system with a graphical user interface (GUI) to access the Internet and is preferably equipped with graphical World Wide Web (Web) browser software, such as Mozilla Firefox®, operable to read and send Hypertext Markup Language (HTML) forms from and to a Hypertext Transport Protocol (HTTP) server on the Web. Client CD players may have built-in interfaces that enable them to communicate with the application server 115 via the network 105, either directly or through a computer. For example, a CD player may have a data interface (e.g., an IDE interface or a USB interface) that enables the CD player to send and receive data from a computer, which in turn is coupled to the network 105.

Likewise, the application server 115 includes hardware and software for communicating with the clients 110. For example, the application server 115 may have HTTP compliant software, an operating system and common gateway interface (CGI) software for interfacing with clients 110 via the network 105. Alternatively, the application server 115 and clients 110 may run proprietary software that enables them to communicate via the network 105.

It will be readily appreciated that the schematic of FIG. 1 is for explanatory purposes, and that numerous variations are clearly possible. For example, the application server 115 may be connected to a local area network (LAN), which in turn may be connected to the network 105; the application server 115 may be coupled to multiple Web servers; and the system 100 may include a database (or system of databases) arranged in a different configuration than the databases depicted here.

Constructing Album Data

Generating album data from track data involves analyzing a juxtaposition of individual audio track data from various sources and generating the album data based on the juxtaposition. Referring to FIG. 1, the application server 115 identifies one or more set of tracks, each set of tracks having a similar album title from a single client device 110 (i.e., source). To identify this similar album title, the application server 115 analyzes the metadata associated with each track of the set of tracks from one particular client device 110. The metadata of certain tracks may include, for example, the album title "What's Going On" and the artist "Marvin Gaye"; the application server 115 will identify these tracks showing this album title and take this set of tracks into consideration for further processing.

The application server 115 may have gathered this track data (i.e., metadata) during a fingerprinting process that the application server 115 provides as a service to users. The client device 110 accesses the application server 115 when the user instructs the client device 110 to obtain a fingerprint on a particular track. During the ensuing fingerprinting process, the application server 115 gathers from the client device 110 metadata of tracks. The application server 115 may receive metadata of individual tracks even if the individual tracks are stored outside of the context of an album. The application server 115 does not have to inform the user that the application server 115 is gathering track data from the client device 110. The gathering of track data is part of the fingerprinting service and may run as a backend process. The backend process runs on the side of the application server 115 and is configured not to be noticeable by the user. Alternatively, the application server 115 may gather track data from a client device 110 anytime the client device 110 accesses the application server 115 for any other reason.

Accordingly, a given user typically initiates a fingerprinting process on selected tracks. Many other users also carry out such fingerprinting via their own client devices 110. Over a time period (e.g., minutes, hours or days), the application server 115 gathers a multitude of information related to the individual tracks being fingerprinted.

The application server 115 stores, among other things, the gathered fingerprints and metadata in the tracks database 125; alternatively, the application server 115 stores the fingerprints in some other database. The gathered metadata may include album data to which the application server 115 did not previously have access. Such newly acquired album data is a bonus because the new album data provides valuable information that the application server 115 may use for further processing. The application server 115 may also have metadata previously stored.

A purpose of the system 100 is to construct album data using the track data after the application server 115 has access to a sufficient amount of track data, including fingerprints and metadata in the tracks database 125. It is inadequate to identity album data of a track using a fingerprint only. A track (i.e., data block storing at least a portion of a song) cannot be reliably matched to an album based on the track's identification alone. The song (i.e., musical composition) that is in the track may happen to have another slightly different version, or the exact same version, that is part of a different album (e.g., a "Greatest Hits" album). Likewise, it is inadequate to rely on only the metadata of one track to determine if that one track belongs to a particular album. The metadata may be wrong. For example, a user may have accessed the metadata and changed the album name or artist name, etc. Accordingly, the system must perform additional processing in order to associate that track with the appropriate album.

After considering all the tracks that have a similar album title according to the metadata, the application server 115 collects each of the fingerprints associated with each of these tracks. The fingerprint provides an independent piece of track identification and is unaffected by metadata. A fingerprint precisely identifies a track, which is associated with metadata. The application server 115, as described above, may then group together a single user's tracks that have the same album title according to their metadata. The application server 115 does this grouping for each individual user's track data.

The application server 115 then searches for matching fingerprints across all fingerprints inputted that come from an album with a similar title. In other words, for all users, the application server 115 matches tracks that have substantially the same fingerprint and substantially the same album title. The album title is obtained from the metadata of each track. So, each track may have a varying number of matched fingerprints and album titles when the system sums matches from across all users. For example, a particular track may have a sum of 50 matched fingerprints and album titles from across all users, while another particular track may have a sum of 23 matched fingerprints and album titles from across all users.

The application server 115 may then group tracks that match according to an original album title in the metadata. Accordingly, the system 100 now has a reasonable grouping of every instance, within the system 100, of any track of a particular album. At this point, the system 100 likely has groupings for many different albums.

The application server 115 then mines across all the track data from all client devices 110, and from previously stored track data, to generate a juxtaposition of track data. The "juxtaposition of track data" means the placement together of all the gathered track data in an organized manner for comparison purposes to generate album data. The juxtaposition of the track data is the result of the mining process, which is described further below. The application server 115 uses the juxtaposition of track data obtained from the mining to generate a description of each album. All the track data that needs to be mined should, at this point, be stored in the tracks database 125 offline. In other words, the application server 115 preferably does not have to re-access any of the client devices 110; however, such re-accessing of client devices 110 may take place in an alternative embodiment.

Mining across all the track data includes reading each matching fingerprint and determining the track data from across every matching track of every album. The system here is determining matching fingerprints and then reading the track data of each track of the matching fingerprints, in that sequence. Accordingly, the matching fingerprints will not necessarily have matching album data in the metadata associated with the matching fingerprints. This is possible, for example, if a record label (i.e., record company) releases a song for a regular album and then later releases the same song for a greatest hits album. Likewise, the matching fingerprints will not necessarily have matching song names in the metadata associated with the matching fingerprints; this discrepancy happens quite often in classical music, for example.

Mining across all track data further includes reading (1) the number of tracks each client device had, (2) the maximum track each client device had for each album and (3) the track count values (when present) from each track to determine how many albums match among client devices and what data each album had. The "number of tracks each client device had" means the number of tracks that each particular user had fingerprinted within a particular set of tracks having a similar title; most users are likely to fingerprint an entire album. Accordingly, the total number of tracks on the official album is likely to be a common number that the system 100 comes across. The "maximum track each user had" means the highest track number that a particular user happened to fingerprint; each track is associated with a track number metadata field. Accordingly, if a user fingerprinted only the last three tracks of an album, the system is able to store the correct last track number for that album. A "track count value" means metadata indicating the total number of tracks for an album. If the system can obtain this total number (the track count value), the system may not have to perform indirect comparing operations for determining the total number of tracks.

The application server 115 may then generate album data based on the juxtaposition of track data obtained from all the mining. Generating album data includes constructing one or more TOCs for the one or more albums. The application server 115 is combining information obtained from the prior processes, discussed above, to formulate a best guess of the TOC for each album in consideration. At this point, the application server 115 preferably has a multitude of data from which to generate a TOC that is likely the best representation of a TOC for a particular album. For example, the application server may have identified that 45 client devices indicated Marvin Gaye's "What's Going On" album has 9 total tracks, while only 3 client devices indicated 8 total tracks; the application server will likely use the number 9 as the total number of tracks for that album. The application server 115 also has the appropriate fingerprints and other matching metadata for each album considered. Accordingly, the application server 115 may construct a reliable TOC for each album based on the data analysis operations described above.

For each album in consideration, the application server 115 accesses the tracks database 125 to determine if any album data obtained from these processes is already stored in the albums database 120. If the album data is not stored in the albums database 120, then the application server 115 adds the album data to the albums database 120. These additions should be easy because, at this point, the system 100 likely has immediate offline access to all the necessary information to make the particular album. The albums database 120 now includes a reliable collection of TOCs for all the albums of the system 100. The albums database 120 may also include pointers to associated tracks, metadata and fingerprints stored in the tracks database 125. Other configurations exist as well.

Using Album Data

Figure 2:
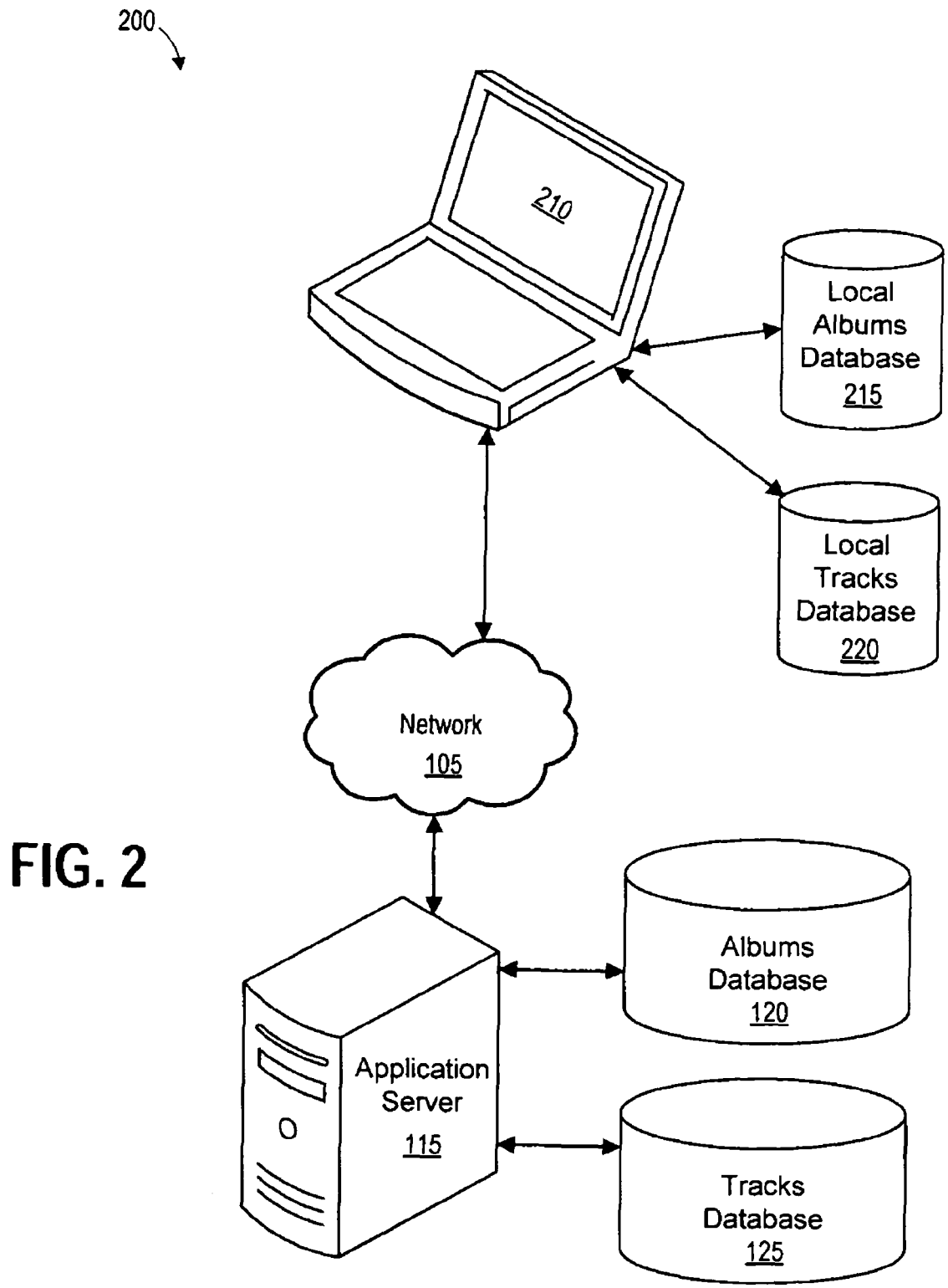
FIG. 2 is a block diagram of a system for using album data constructed using discrete track data from multiple sources, in accordance with some embodiments.

FIG. 2 is a block diagram of a system 200 for using album data constructed using discrete track data from multiple sources, in accordance with some embodiments. This system 200 may be implemented by using a user computer 210 that may, but does not have to, operate according to the client-server configuration discussed with reference to FIG. 1. For example, the user computer 210 may be coupled to the network 105; however, the coupling to the network 105 is optional. In some instances, the user computer 210 may perform processes of the system 200 offline.

All software and data necessary for using the album data may be stored on a local storage device associated with the user computer 210. For example, the user computer 210 may have a local albums database 215, containing a complete set or a subset of the information available in the corresponding albums database 120 coupled to the application server 115. The user computer 210 may load the local albums database 215 with albums data from a CD-ROM (not shown). The local albums database 215 may be on the hard disk of the user computer 210. Alternatively, the user computer 210 may download the albums data to the local albums database 215 from the albums database 120 via the network 105. Other configurations exist as well.

The user computer 210 may also have a local tracks database 215, containing the user's own tracks data or a subset of the tracks data available in the tracks database 125, which is coupled to the application server 115. The tracks database 220 may include tracks, metadata and fingerprints. The user computer 210 may, for example, rip tracks from a CD and convert the tracks to mp3 format. Alternatively, the user computer 210 may download tracks from various Web sites via the network 105. The user computer 210 may also initiate a fingerprinting process on tracks by accessing a fingerprinting service provided by the application server 115. Alternatively, the user computer 210 may have a local fingerprinting application for generating fingerprints locally. Other configurations exist as well.

Accordingly, the user computer 210 may access the albums database 120 via the network 105 or may download at least a portion of the albums data from the albums database 120 to the local albums database 215. The user computer 210 may then provide reliable TOC information according to the user's input. For example, the user may select a track from the local tracks dataset 220 while the user computer 210 is offline; the user computer 210 may provide the relevant TOC information automatically by accessing the local albums database 215; and/or the user computer 210 may retrieve the TOC information from the local albums database 215 upon the user's request. In another example, the user may select a track from the local tracks dataset 220 while the user computer 210 is coupled to the network 105; the application server 115 may provide the relevant TOC information automatically by accessing the albums database 120; and/or the user computer 210 may retrieve the TOC information from the albums database 125 upon the user's request. In still another example, the user may select a track from the tracks dataset 125 while the user computer 210 is coupled to the network 105; the application server 115 may provide the relevant TOC information automatically by accessing the albums database 120; and/or the user computer 210 may retrieve the TOC information from the albums database 125 upon the user's request.

Method Overview

Figure 3:
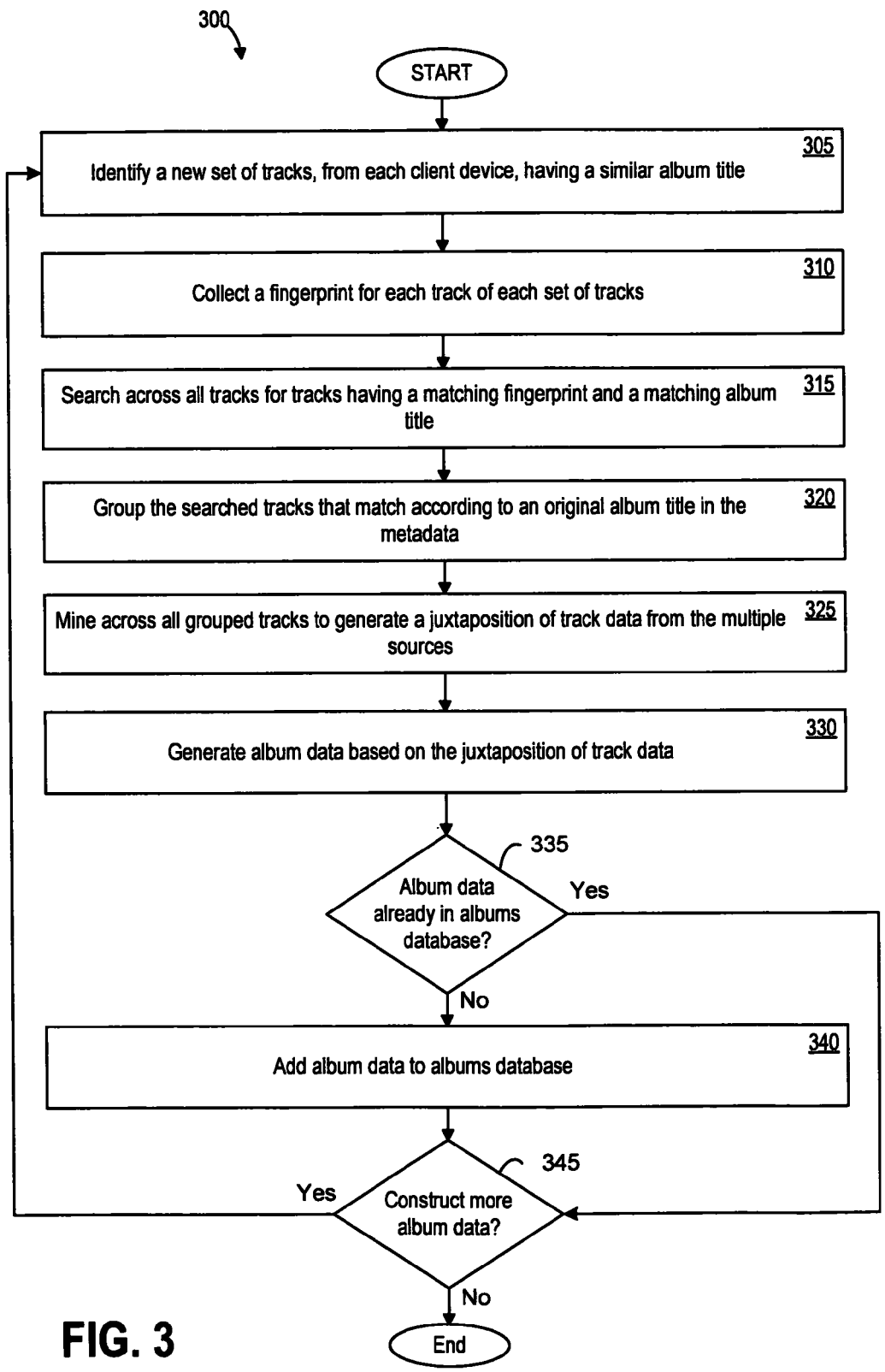
FIG. 3 is a flowchart of a method for constructing album data using discrete track data from multiple sources, in accordance with some embodiments.

FIG. 3 is a flowchart of a method 300 for constructing album data using discrete track data from multiple sources, in accordance with some embodiments. In some embodiments, the steps of the method 300 may be carried out by the application server 115 of FIG. 1.

The method 300 starts in a step 305 where the system identifies a new set of tracks, from each client device, having a similar album title. The method 300 then moves to a step 310 where the system collects a fingerprint for each track of each set of tracks. Next, in a step 315, the system searches across all tracks for tracks having a matching fingerprint and a matching album title. Then, in a step 320, the system groups the searched tracks that match according to an original album title in the metadata. The method then proceeds to a step 325 where the system mines all grouped track data to generate a juxtaposition of track data from the multiple sources. Moving to a step 330, the system uses the juxtaposition of track data to generate album data. The generation of album data includes constructing one or more TOCs for the one or more albums.

In a decision operation 335, the system determines if any album data obtained from these processes is already in the albums database. If any of the obtained album data is not already in the albums database, then the method 300 moves to a step 340 where the system adds that album data to the albums database; and the method 300 then moves to a decision operation 345. However, if all the obtained album data is already in the albums database, then the method 300 moves to a decision operation 345.

In the decision operation 345, the system determines if more album data is to be constructed. If more album data is to be constructed, then the method 300 returns to the step 305 and continues. However, if no more album data is to be constructed, then the method 300 concludes.

Figure 4:
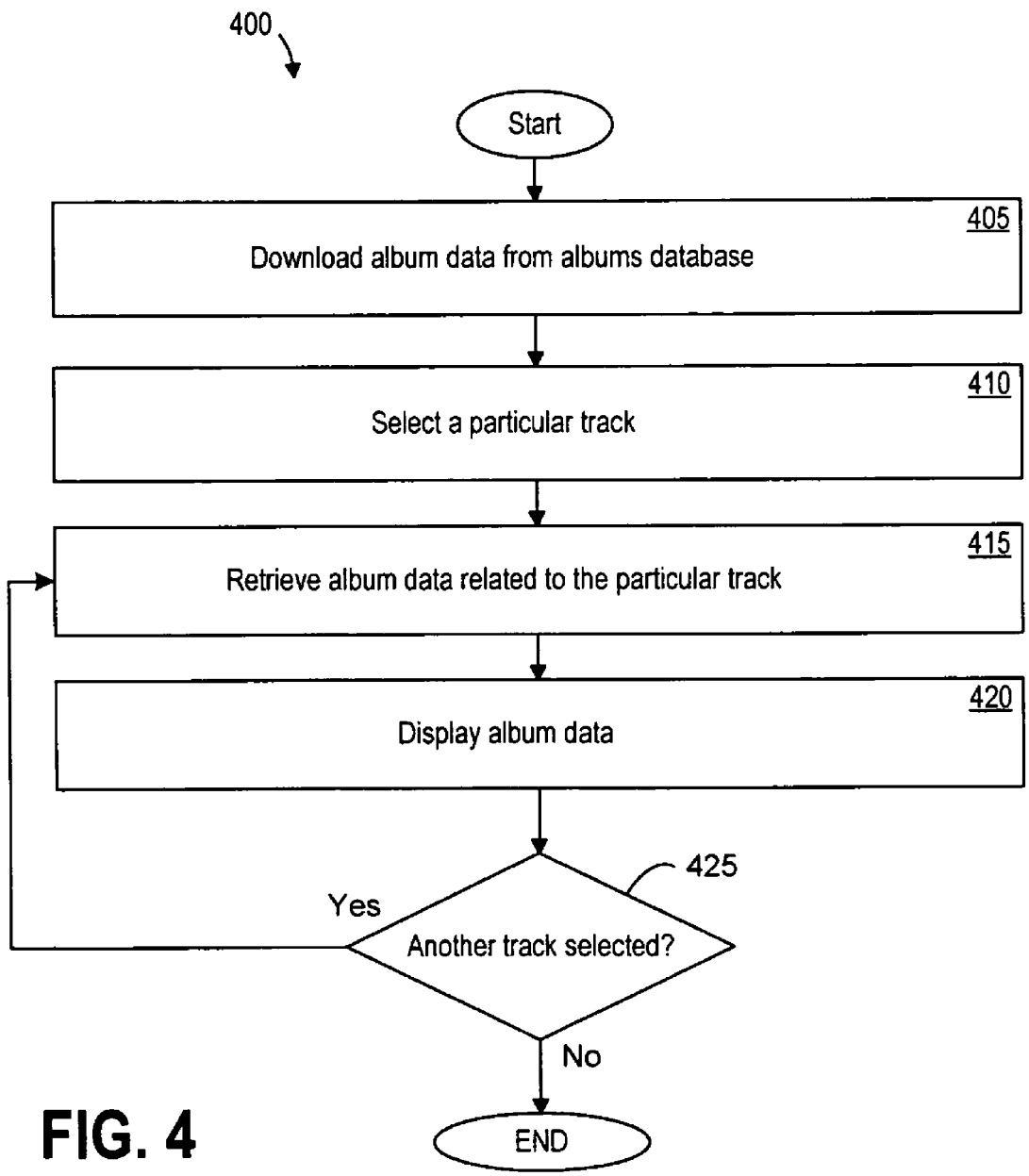
FIG. 4 is a flowchart of a method for using the album data constructed using discrete track data from multiple sources, in accordance with some embodiments.

FIG. 4 is a flowchart of a method 400 for using the album data constructed using discrete track data from multiple sources, in accordance with some embodiments. In some embodiments, the steps of the method 400 may be carried out by the user computer 210 of FIG. 2.

The method 400 starts in a step 405 where the system downloads album data from the albums database. The system may store this downloaded album data on a local albums database. The method 400 then moves to a step 410 where the system selects a particular track, for example, to playback on the user computer. Next, in a step 415, the system retrieves album data related to the particular track. The user computer may retrieve the album data from the local albums database or from the main albums database that is networked to the user computer. Moving to a step 420, the system may display the album data on the user computer.

In a decision operation 425, the system determines if another track has been selected. If another track has been selected, the method 400 returns to the step 415 and continues. However, if another track has not been selected, then the method 400 concludes.

Note that these methods may include other details and steps that are not discussed in these method overviews. Other details and steps are discussed above with reference to the appropriate figures and may be a part of a present method, depending on the embodiment.

Computer Readable Medium Implementation

Portions of some embodiments may be conveniently implemented by using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

An implementation may include a computer program product which is a storage medium (media) having instructions stored thereon/in which can be used to control, or cause, a computer to perform any of the processes of the implementation. The storage medium can include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some implementations include software for controlling both the hardware of the general purpose/specialized computer or microprocessor, and for enabling the computer or microprocessor to interact with a human user or other mechanism utilizing the results of the particular embodiment. Such software may include without limitation device drivers, operating systems, and user applications. Ultimately, such computer readable media further includes software for performing aspects of the invention, as described above.

Included in the programming (software) of the general/specialized computer or microprocessor are software modules for implementing the teachings of the invention, including without limitation identifying one or more set of tracks having a similar album title, wherein the one or more set of tracks are obtained from one or more client devices, searching across the one or more set of tracks for tracks having a matching fingerprint and a matching album title, grouping tracks that match according to an original album title in metadata to obtain grouped tracks, mining across the grouped tracks to generate a juxtaposition of track data from the one or more client devices, and generating album data for one or more albums based on the juxtaposition of track data, according to the processes described above.

Advantages

Embodiments of the present system generate album data by juxtaposing track data from multiple sources, including multiple client devices. These implementations gather and compare track data from many sources. The resulting album data is highly likely to be an accurate representation of the original album data of the original albums. Also, the resulting album identifiers are high likely to be accurate identifiers for the album data. Thus, the resulting album data is highly reliable.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for constructing album data, the method comprising:
   for each of a plurality of client devices, obtaining track data for one or more tracks of the client device, the track data including an original album title in track metadata;
   from among the one or more tracks of the plurality of client devices for which the track data is obtained, identifying one or more set of tracks having a similar album title;
   searching across the one or more set of tracks for matching tracks having a matching fingerprint and a matching album title according to an original album title in track metadata, the searching including comparing a combination of the track fingerprint and the track album title for each of the one or more set of tracks;
   grouping the matching tracks, the matching tracks being grouped according to an original album title in metadata to obtain grouped matching tracks;
   mining across the track data of the grouped matching tracks to generate a juxtaposition of the track data of the grouped matching tracks; and
   generating album data for one or more albums based on the juxtaposition of the track data of the grouped matching tracks.

2. The method of claim 1, wherein the generating album data comprises constructing one or more table of contents for the one or more albums.

3. The method of claim 1, further comprising at least one of:
   determining that particular album data of the one or more albums is not in an albums database; and
   adding the particular album data to the albums database.

4. The method of claim 1, wherein identifying the one or more set of tracks is followed by collecting a fingerprint for each track of the one or more set of tracks, wherein the fingerprint provides an independent piece of track identification and is unaffected by metadata.

5. The method of claim 1, wherein the mining across the track data of the grouped matching tracks comprises:
   determining matching fingerprints; and
   reading non-fingerprint metadata included in the track data of each track of the matching fingerprints.

6. The method of claim 5, wherein particular matching fingerprints do not have matching album data in track data associated with the particular matching fingerprints.

7. The method of claim 5, wherein particular matching fingerprints do not have matching song names in metadata track data associated with the matching fingerprints.

8. The method of claim 1, wherein the mining across the track data of the grouped matching tracks comprises:
   reading a number of tracks that each client device had fingerprinted, wherein a client device is a device that provided a set of tracks;
   reading a maximum track that each client device had for each album; and reading track count values from each track to determine how many albums
   match among client devices.

9. The method of claim 1, wherein the mining across the track data of the grouped matching tracks is performed offline without accessing any of the plurality of client devices that provided a set of tracks.

10. The method of claim 1, further comprising sending at least some of the album data to a user computer, wherein the user computer is configured for using the album data to provide reliable album data for a selected track.

11. A system for constructing album data, the system comprising:
   an obtaining unit constructed to obtain for each of a plurality of client devices track data for one or more tracks of the client device, the track data including an original album title in track metadata;
   an identifying unit constructed to identify, from among the one or more tracks of the plurality of client devices for which the track data is obtained, one or more set of tracks having a similar album title;
   a searching unit constructed to search across the one or more set of tracks for matching tracks having a matching fingerprint and a matching album title according to an original album title in track metadata, the searching including comparing a combination of the track fingerprint and the track album title for each of the one or more set of tracks;
   a grouping unit constructed to group the matching tracks, the matching tracks being grouped according to an original album title in metadata to obtain grouped matching tracks;

a mining unit constructed to mine across the track data of the grouped matching tracks to generate a juxtaposition of the track data of the grouped matching tracks; and a generating unit constructed to generate album data for one or more albums based on the juxtaposition of the track data of the grouped matching tracks, wherein at least one of the obtaining unit, identifying unit, searching unit, grouping unit, mining unit and generating unit comprises at least one of a processor and a memory.

12. The system of claim 1 wherein the generating unit constructs one or more table of contents for the one or more albums.

13. The system of claim 11, wherein the system further comprises at least one of:

a determining unit constructed to determine that particular album data of the one or more albums is not in an albums database; and an adding unit constructed to add the particular album data to the albums database.

14. The system of claim 11, wherein the system further comprises a fingerprint unit constructed to collect a fingerprint for each track of the one or more set of tracks after the one or more set of tracks are identified, wherein the fingerprint provides an independent piece of track identification and is unaffected by metadata.

15. The system of claim 11, wherein the mining unit comprises:

a determining unit constructed to determine matching fingerprints; and a reading unit constructed to read non-fingerprint metadata included in the track data of each track of the matching fingerprints.

16. The system of claim 15, wherein particular matching fingerprints do not have matching album data in track data associated with the particular matching fingerprints.

17. The system of claim 15, wherein particular matching fingerprints do not have matching song names in track data associated with the matching fingerprints.

18. The system of claim 11, wherein the mining unit comprises:

a number reading unit constructed to read a number of tracks that each client device had fingerprinted, wherein a client device is a device that provided a set of tracks;

a maximum track reading unit constructed to read a maximum track that each client device had for each album; and a track count reading unit constructed to read track count values from each track to determine how many albums match among client devices.

19. The system of claim 11, wherein the mining unit performs the mining across the track data of the grouped matching tracks offline without accessing any of the plurality of client devices that provided a set of tracks.

20. The system of claim 11, wherein the system further comprises a sending unit constructed to send at least some of the album data to a user computer, wherein the user computer is configured for using the album data to provide reliable album data for a selected track.

21. A computer readable storage medium retrievably storing one or more instructions for constructing album data, wherein the one or more instructions, when executed by one or more processors, cause the one or more processors to perform the steps of:

for each of a plurality of client devices, obtaining track data for one or more tracks of the client device, the track data including an original album title in track metadata;

from among the one or more tracks of the plurality of client devices for which the track data is obtained, identifying one or more set of tracks having a similar album title;

searching across the one or more set of tracks for matching tracks having a matching fingerprint and a matching album title according to an original album title in track metadata, the searching including comparing a combination of the track fingerprint and the track album title for each of the one or more set of tracks;

grouping the matching tracks, the matching tracks being grouped according to an original album title in metadata to obtain grouped matching tracks;

mining across the track data of the grouped matching tracks to generate a juxtaposition of the track data of the grouped matching tracks; and generating album data for one or more albums based on the juxtaposition of the track data of the grouped matching tracks.

22. The method of claim 1, wherein each track data includes non-fingerprint metadata.

23. The method of claim 5, wherein non-fingerprint metadata included in track data of each of particular matching fingerprints do not match, and wherein in the reading step the non-fingerprint metadata included in the track data of each of the particular matching fingerprints is read.

* * * * *